US008183786B2

(12) United States Patent
Park et al.

(10) Patent No.: US 8,183,786 B2
(45) Date of Patent: May 22, 2012

(54) LIQUID CRYSTAL DISPLAY AND METHOD OF DRIVING THE SAME

(75) Inventors: Se-Ki Park, Suwon-si (KR); Byoung-Dae Ye, Yongin-si (KR); Gi-Cheri Kim, Yongin-si (KR); Dong-Min Yeo, Asan-si (KR)

(73) Assignee: Samsung Electronics Co., Ltd. (KR)

(*) Notice: Subject to any disclaimer, the term of this patent is extended or adjusted under 35 U.S.C. 154(b) by 613 days.

(21) Appl. No.: 12/394,790

(22) Filed: Feb. 27, 2009

(65) Prior Publication Data

US 2009/0284175 A1 Nov. 19, 2009

(30) Foreign Application Priority Data

May 19, 2008 (KR) ........................ 10-2008-0046137

(51) Int. Cl.
*H05B 37/02* (2006.01)
*G02F 1/13357* (2006.01)

(52) U.S. Cl. .................................... 315/169.3; 362/97.2

(58) Field of Classification Search ............... 315/169.3, 315/294; 362/97.2; 345/89, 102
See application file for complete search history.

(56) References Cited

U.S. PATENT DOCUMENTS

2008/0112164 A1* 5/2008 Teshirogi ...................... 362/231

FOREIGN PATENT DOCUMENTS

| | | | |
|---|---|---|---|
| JP | 2005136157 | A | 5/2005 |
| JP | 2007317423 | A | 12/2007 |
| KR | 1020060124541 | A | 12/2006 |

* cited by examiner

*Primary Examiner* — Daniel D Chang
(74) *Attorney, Agent, or Firm* — Cantor Colburn LLP

(57) ABSTRACT

A liquid crystal display ("LCD") includes; a liquid crystal panel which displays an image, and a plurality of light-emitting blocks which provide light to the liquid crystal panel, wherein each of the light-emitting blocks includes a first string having a plurality of first light-emitting elements connected in series and a second string having a plurality of second light-emitting elements connected in series, and an amount of light emitted by each of the first light-emitting elements is different from an amount of light emitted by each of the second light-emitting elements.

20 Claims, 16 Drawing Sheets

LIQUID CRYSTAL DISPLAY AND METHOD OF DRIVING THE SAME

This application claims priority to Korean Patent Application No. 10-2008-0046137, filed on May 19, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") and a method of driving the LCD, and more particularly, to an LCD and a method of driving the LCD, which can improve the quality of display.

2. Description of the Related Art

Liquid crystal displays ("LCDs") generally include a first display panel having a plurality of pixel electrodes, a second display panel having a common electrode, and a liquid crystal panel having a dielectric-anisotropy liquid crystal layer interposed between the first and second display panels. An LCD may display a desired image by generating an electric field between the plurality of pixel electrodes and the common electrode, and adjusting the intensity of the electric field so as to control the amount of light transmitted through the liquid crystal panel. Most LCDs are not self-emitting display devices and may thus include a plurality of light-emitting elements disposed to supply a light to the first and second display panels. In some LCDs, light-emitting blocks are disposed behind the first and second display panels as the light-emitting elements.

Recently, various techniques of improving the quality of display by controlling the luminance the light-emitting blocks, and thereby also controlling the luminance of an image displayed by an LCD have been developed.

BRIEF SUMMARY OF THE INVENTION

Aspects of the present invention provide a liquid crystal display ("LCD") which can improve the quality of display.

Aspects of the present invention also provide a method of driving an LCD, which can improve the quality of display.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an exemplary embodiment of the present invention, an LCD includes; a liquid crystal panel which displays an image, and a plurality of light-emitting blocks which provide light to the liquid crystal panel, wherein each of the light-emitting blocks includes a first string having a plurality of first light-emitting elements connected in series and a second string having a plurality of second light-emitting elements connected in series, and an amount of light emitted by each of the first light-emitting elements is different from an amount of light emitted by each of the second light-emitting elements.

According to another exemplary embodiment of the present invention, there is provided a method of driving an LCD, the method includes; providing an LCD which includes a liquid crystal panel having a plurality of display blocks and a plurality of light-emitting blocks respectively corresponding to the display blocks, each of the light-emitting blocks including a first string which has a plurality of first light-emitting elements connected in series and a second string which has a plurality of second light-emitting elements connected in series, determining luminance levels of the plurality of light-emitting blocks according to a plurality of images respectively displayed by the plurality of display blocks, providing light to the each of the plurality of display blocks while simultaneously controlling an amount of light emitted by each of the first light-emitting elements and an amount of light emitted by each of the second light-emitting elements to differ from each other, and each of the display blocks displaying an image using the provided light.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
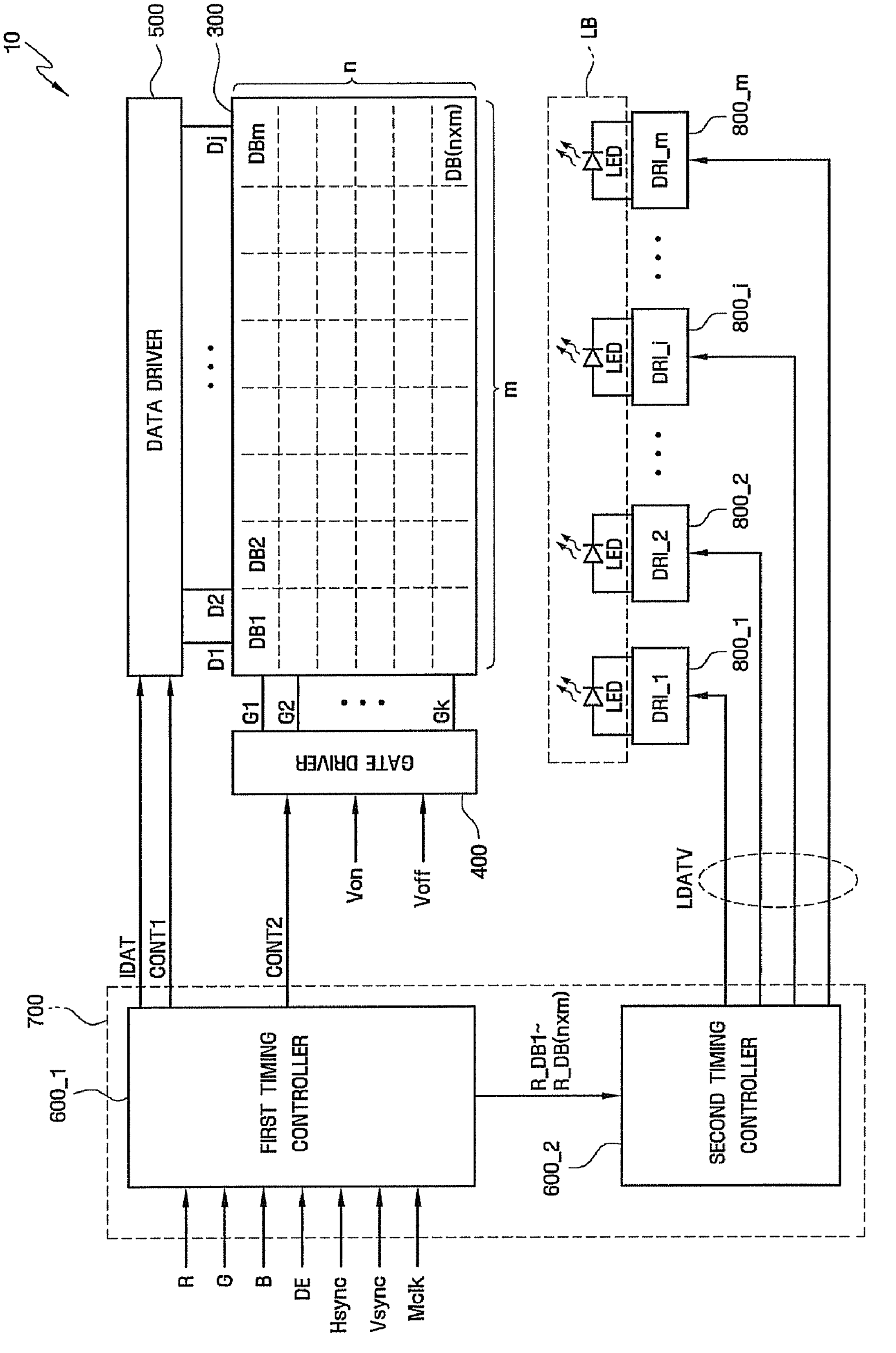
FIG. 1 illustrates a block diagram of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "lower" or "bottom" and "upper" or "top" may be used herein to describe one element's relationship to another element as illustrated in the figures. It will be understood that relative terms are intended to encompass different orientations of the device in addition to the orientation depicted in the figures. For example, if the device in the figures is turned over, elements described as being on the "lower" side of other elements would then be oriented on "upper" sides of the other elements. The exemplary term "lower" can therefore encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" and "beneath" can, therefore, encompass both an orientation of above and below.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. Hereinafter, the present invention will be described in detail with reference to the accompanying drawings.

Figure 2:
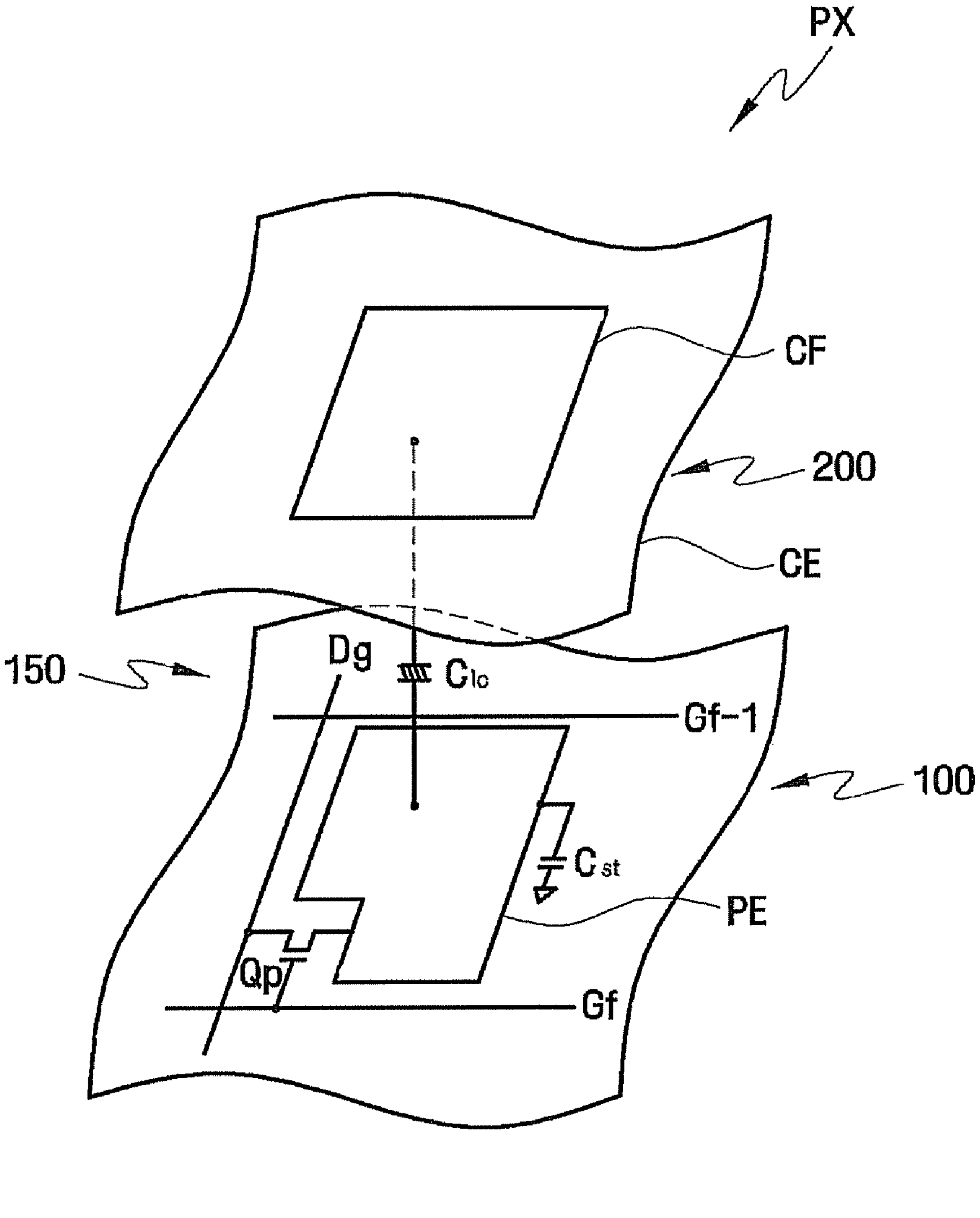
FIG. 2 illustrates an equivalent circuit diagram of an exemplary embodiment of a pixel of the exemplary embodiment of an LCD shown in FIG. 1.
Figure 3:
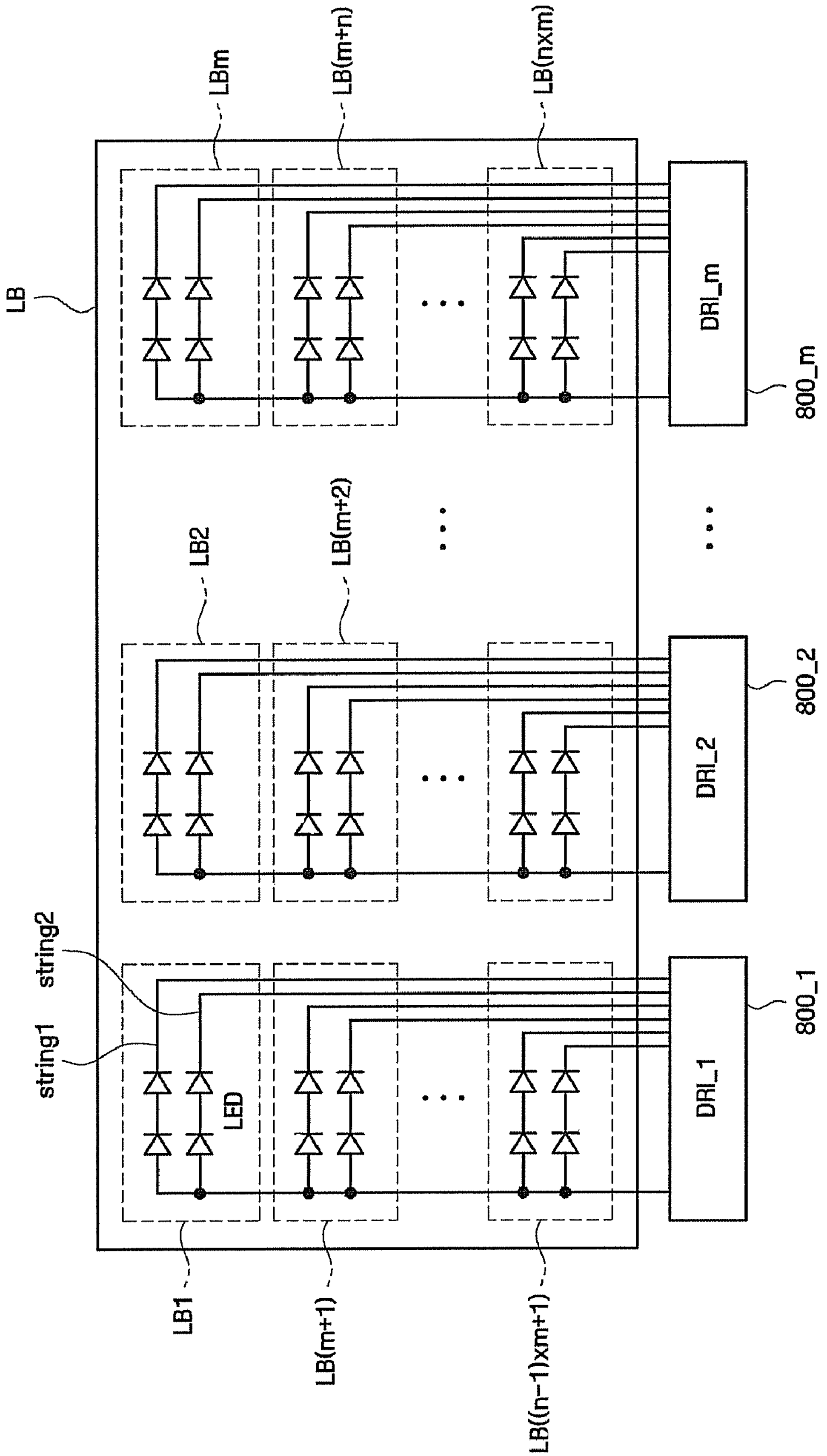
FIG. 3 illustrates a block diagram of an exemplary embodiment of a light-emitting block module shown in FIG. 1 and illustrates connections between the exemplary embodiment of a light-emitting block module and an exemplary embodiment of a plurality of backlight drivers shown in FIG. 1.
Figure 4:
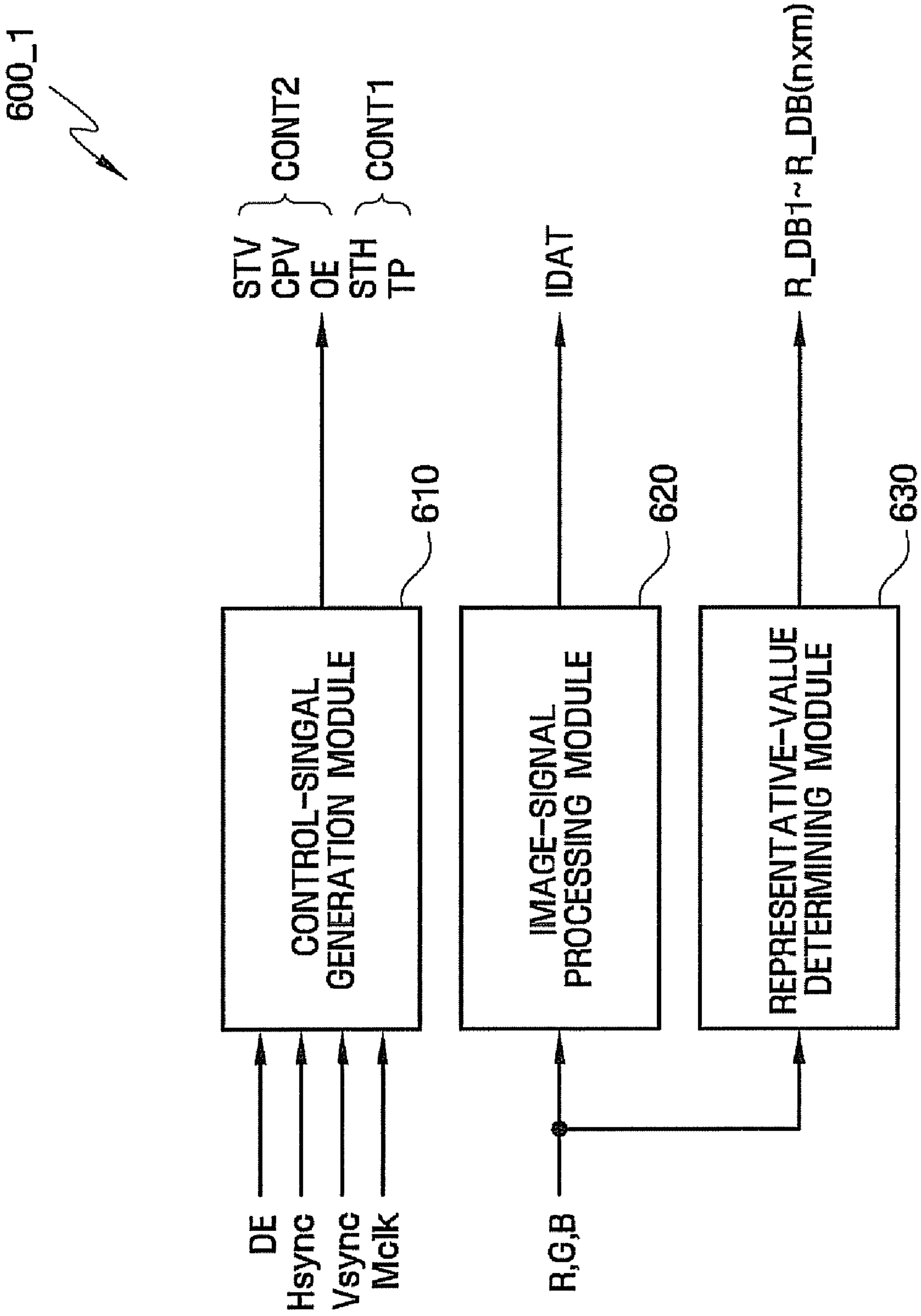
FIG. 4 illustrates a block diagram of an exemplary embodiment of a first timing controller as shown in FIG. 1.
Figure 5:
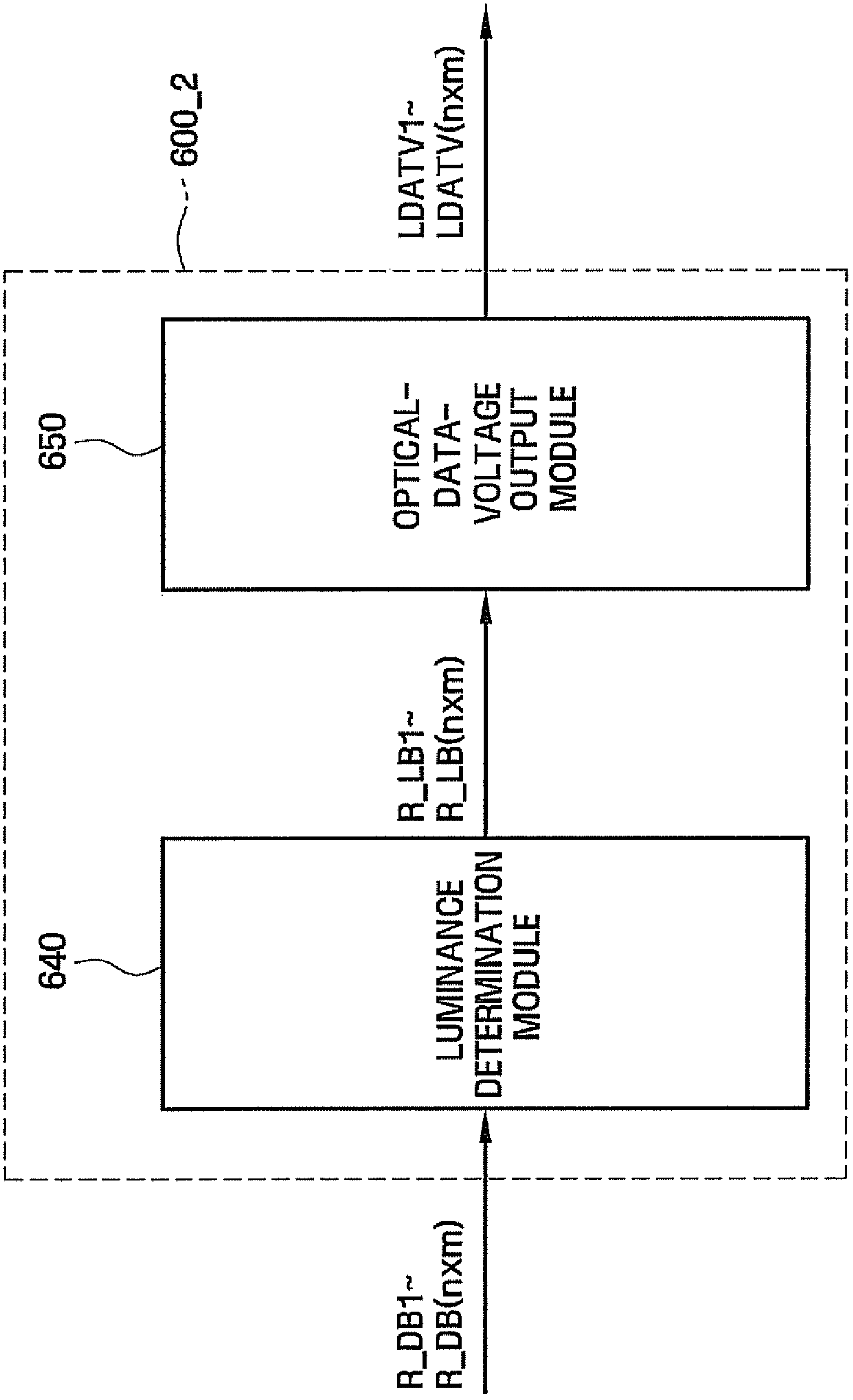
FIG. 5 illustrates a block diagram of an exemplary embodiment of a second timing controller as shown in FIG. 1.

An exemplary embodiment of a liquid crystal display ("LCD") and an exemplary embodiment of a method of driving the exemplary embodiment of an LCD according to the present invention will hereinafter be described in detail with reference to FIGS. 1 through 5. FIG. 1 illustrates a block diagram of an exemplary embodiment of a liquid crystal display 10 according to the present invention, FIG. 2 illustrates an equivalent circuit diagram of an exemplary embodiment of a pixel PX of the exemplary embodiment of an LCD 10, FIG. 3 illustrates a block diagram of an exemplary embodiment of a light-emitting block module LB shown in FIG. 1 and illustrates connections between the exemplary embodiment of a light-emitting block module LB and exemplary embodiments of first through m-th backlight drivers 800_1 through 800_m show in FIG. 1 are connected, FIG. 4 illustrates a block diagram of an exemplary embodiment of a first timing controller 600_1 show in FIG. 1; and FIG. 5 illustrates a block diagram of an exemplary embodiment of a second timing controller 600_2 shown in FIG. 1.

Referring to FIG. 1, the LCD 10 includes a liquid crystal panel 300, a gate driver 400, a data driver 500, a timing controller 700, the first through m-th backlight drivers 800_1 through 800_m, and the light-emitting block module LB connected to the first through m-th backlight drivers 800_1 through 800_m.

The timing controller 700 is functionally divided into the first and second timing controllers 600_1 and 600_2. The first timing controller 600_1 controls an image displayed by the liquid crystal panel 300, and the second timing controller 600_2 controls the first through m-th backlight drivers 800_1 through 800_m. Exemplary embodiments include configurations wherein the first and second timing controllers 600_1 and 600_2 are physically separate from each other, alternative exemplary embodiments include configurations wherein the first and second timing controllers 600_1 and 600_2 are physically connected.

The liquid crystal panel 300 is divided into a plurality of display blocks DB1 through DB(n×m). In one exemplary embodiment, the display blocks DB1 through DB(n×m) may be arranged in a matrix. The light-emitting block module LB includes a plurality of light-emitting blocks, which in the present exemplary embodiment respectively correspond to the display blocks DB1 through DB(n×m). The liquid crystal panel 300 includes a plurality of gate lines G1 through Gk and a plurality of data lines D1 through Dj. A plurality of pixels is defined at the intersections between the gate lines G1 through Gk and the data lines D1 through Dj. In the present exemplary embodiment each of the display blocks DB1 through DB(n×m) includes a plurality of pixels.

Referring to FIG. 2, a pixel PX, which is connected to an f-th gate line Gf ($1 \leqq f \leqq k$) and a g-th data line Dg ($1 \leqq g \leqq j$), includes a switching element Qp connected to the f-th gate line Gf and the g-th data line Dg, and a liquid crystal capacitor $C_{lc}$ and a storage capacitor $C_{st}$ which are both connected to the switching element Qp. The liquid crystal capacitor $C_{lc}$ includes a pixel electrode PE formed on the first display panel 100 and a common electrode CE formed on the second display panel 200. A color filter CF overlaps at least a part of the common electrode CE.

Referring to FIG. 1, the timing controller 700 receives an image signal (in the present exemplary embodiment the image signal includes red (R), green (G), and blue (B) image signals) and a plurality of external control signals Vsync, Hsync, Mclk, and DE for controlling the display of the image signal (R, G, and B) and outputs an image data signal IDAT, a data control signal CONT1, a gate control signal CONT2 and an optical data voltage LDATV. More specifically, the timing controller 700 outputs the image data signal IDAT corresponding to the image signal (R, G and B). In addition, the timing controller 700 provides the optical data voltage LDATV to the display blocks DB1 through DB(n×m) in order to display an image.

The first timing controller 600_1 receives the image signal (R, G and B) and outputs the image data signal IDAT corresponding to the image signal (R, G and B). The first timing controller 600_1 receives the external control signals Vsync, Hsync, Mclk, and DE from an external source and generate the data control signal CONT1 and the gate control signal CONT2. The external control signals Vsync, Hsync, Mclk, and DE include a vertical synchronization signal Vsync, a horizontal synchronization signal Hsync, a main clock signal Mclk, and a data enable signal DE. The data control signal CONT1 is a signal for controlling the operation of the data driver 500, and the gate control signal CONT2 is a signal for controlling the operation of the gate driver 400. The first timing controller 600_1 receives the image signal (R, G and B) and provides a plurality of representative image signals R_DB1 through R_DB(n×m) respectively corresponding to the display blocks DB1 through DB(n×m) to the second timing controller 600_2. The operation and the structure of the first timing controller 600_1 will be described in further detail later with reference to FIG. 4.

The second timing controller 600_2 is provided with the representative image signals R_DB1 through R_DB(n×m), and provides the optical data voltage LDATV corresponding to the representative image signals R_DB1 through R_DB(n×m) to the first through m-th backlight drivers 800_1 through 800_m. The operation and the structure of the second timing controller 600_2 will be described in further detail later with reference to FIG. 5.

The gate driver 400 is provided with the gate control signal CONT2 by the first timing controller 600_1 and applies a gate signal to the gate lines G1 through Gk. In one exemplary embodiment, the gate signal may be a combination of a gate-on voltage Von and a gate-off voltage Voff, which are provided by a gate on/off voltage generation module (not shown). In one exemplary embodiment, the gate control signal CONT1, which is a signal for controlling the operation of the gate driver 400, may include a vertical initiation signal for initiating the operation of the gate driver 400, a gate clock signal for determining when to output the gate-on voltage Von, and an output enable signal for determining the pulse width of the gate-on voltage Von.

The data driver 500 is provided with the data control signal CONT1 by the first timing controller 600_1 and applies a voltage corresponding to the image data signal IDAT to the data lines D1 through Dj. Exemplary embodiments include configurations wherein the data control signal CONT1 may include a plurality of signals for controlling the operation of the data driver 500. Exemplary embodiments of the plurality of signals for controlling the operation of the data driver 500 include a horizontal initiation signal for initiating the operation of the data driver 500 and an output instruction signal for providing instructions to output an image data voltage.

The first through m-th backlight drivers 800_1 through 800_m control the luminance levels of the light-emitting blocks LB1 through LB(n×m) in response to the optical data voltage LDATV. More specifically, exemplary embodiments include configurations wherein the luminance of each of the light-emitting blocks LB1 through LB(n×m) may be controlled according to an image displayed by each of the display blocks DB1 through DB(n×m).

Referring to FIG. 3, in one exemplary embodiment the light-emitting blocks LB1 through LB(n×m) may be arranged in an n×m matrix and may thus correspond to the display blocks DB1 through DB(n×m), respectively. Each of the light-emitting blocks LB1 through LB(n×m) may include at least one light-emitting element (exemplary embodiments of which include a light-emitting diode ("LED")).

The light-emitting blocks LB1 through LB(n×m) may be classified into one or more light-emitting groups, and the luminance levels of the light-emitting groups may be controlled by a number of backlight drivers respectively corresponding to the light-emitting groups. In the exemplary embodiment shown in FIG. 3, there are m columns of light-emitting blocks which are respectively connected to the first through m-th backlight drivers 800_1 through 800_m. The first through m-th backlight drivers 800_1 through 800_m may control the luminance levels of their respective columns of light-emitting blocks.

In such an exemplary embodiment, each of the first through m-th backlight drivers 800_1 through 800_m may have a number of channels corresponding to the number of light-emitting blocks included in the light-emitting group controlled by a corresponding backlight driver. In the exemplary embodiment shown in FIG. 3, the first backlight driver 800_1 may have a number of channels corresponding to the number of light-emitting blocks included in the first row of light-emitting blocks. Since there are n light-emitting blocks (e.g., the light-emitting blocks LB1, LB(m+1), . . . , LB((n−1)×m+1)) included in the first row of light-emitting blocks, the first backlight driver 800_1 may have n channels.

In the present exemplary embodiment, each of the light-emitting blocks LB1 through LB(n×m) may include a first string string1, in which a plurality of first light-emitting elements are connected in series, and a second string string2, in which a plurality of second light-emitting elements are connected in series. In one exemplary embodiment, the amount of light emitted by each of the first light-emitting elements may be different from the amount of light emitted by each of the second light-emitting elements, which will be described later in detail.

The first and second strings string1 and string2 of each of the light-emitting blocks LB1 through LB(n×m) may be connected to a channel of a corresponding backlight driver 800_1 through 800_m, respectively. In one exemplary embodiment, the first and second strings string1 and string2 of each of the light-emitting blocks LB1 through LB(n×m) may both be connected to a single channel.

The first timing controller 600_1 illustrated in FIG. 1 will hereinafter be described in further detail with reference to FIG. 4. Referring to FIG. 4, the first timing controller 600_1 includes a control-signal generation module 610, an image-signal processing module 620, and a representative-value determining module 630.

The control-signal generation module 610 receives the external control signals Vsync, Hsync, Mclk, and DE and outputs the data control signal CONT1 and the gate control signal CONT2. In one exemplary embodiment, the control-signal generation module 610 may output a vertical initiation signal STV for initiating the operation of the gate driver 400, a gate clock signal CPV for determining when to output the gate-on voltage Von, an output enable signal OE for determining the pulse width of the gate-on voltage Von, a horizontal initiation signal STH for initiating the operation of the data driver 400, and an output instruction signal TP for providing instructions to output an image data voltage.

The image-signal processing module 620 may convert the image signal (e.g., R, G and B) into the image data signal IDAT and output the image data signal IDAT.

The representative-value determining module 630 may determine the representative image signals R_DB1 through R_DB(n×m) respectively corresponding to the display blocks DB1 through DB(n×m). In one exemplary embodiment, the representative-value determining module 630 may receive the input signal (R, G and B) and determine the representative image signals R_DB1 through R_DB(n×m). Each of the representative image signals R_DB1 through R_DB(n×m) may be an average of the image signals (R, G and B) provided to a corresponding display block. Therefore, each of the representative image signals R_DB1 through R_DB(n×m) may indicate the average luminance of the corresponding display block. In an alternative exemplary embodiment, each of the representative image signals R_DB1 through R_DB(n×m) may indicate the gray level of the corresponding display block. In an alternative exemplary embodiment the representative-value determining module 630 may determine the representative image signals R_DB1 through R_DB(n×m) using the image data signal IDAT from the image-signal processing module 620, instead of using the image signal (R, G and B).

The second timing controller 600_2 shown in FIG. 1 will hereinafter be described in further detail with reference to FIG. 5. Referring to FIG. 5, the second timing controller 600_2 includes a luminance determination module 640 and an optical-data-voltage output module 650.

The luminance determination module 640 receives the representative image signals R_DB1 through R_DB(n×m), determines luminance levels R_LB1 through R_LB(n×m) of the light-emitting blocks LB1 through LB(n×m), and outputs the luminance levels R_LB1 through R_LB(n×m) to the optical-data-voltage output module 650. The luminance determination module 640 may determine the luminance levels R_LB1 through R_LB(n×m) with reference to a lookup table (not shown).

The optical-data-voltage output module 650 may output a plurality of optical data voltages LDATV1 through LDATV(n×m) respectively corresponding to the luminance levels R_LB1 through R_LB(n×m). In one exemplary embodiment, the optical data voltages LDATV1 through LDATV(n×m) may be analog signals.

Figure 6A:
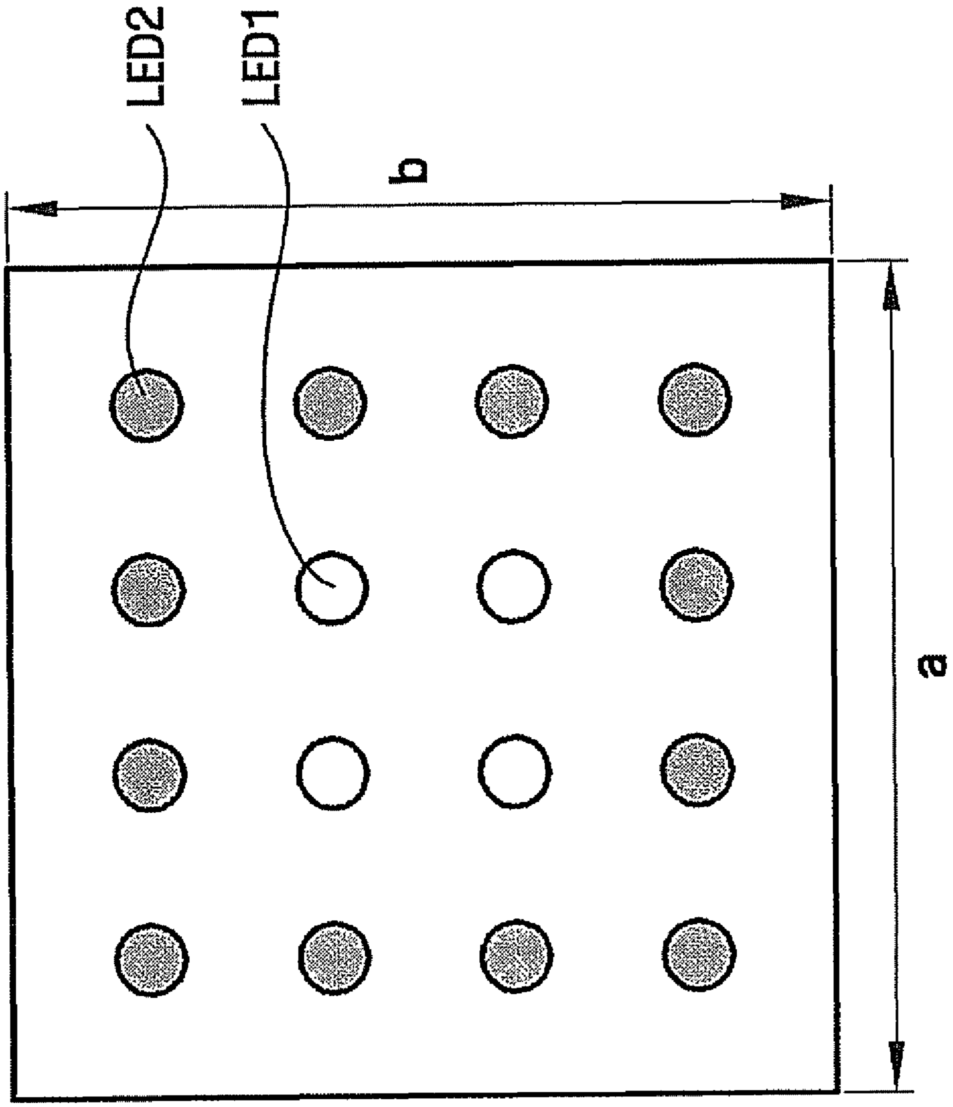
FIGS. 6A and 6B illustrate diagrams of various exemplary arrangements of a plurality of first light-emitting elements and a plurality of second light-emitting elements in each light-emitting block of the exemplary embodiment of an LCD shown in FIG. 1.
Figure 6B:
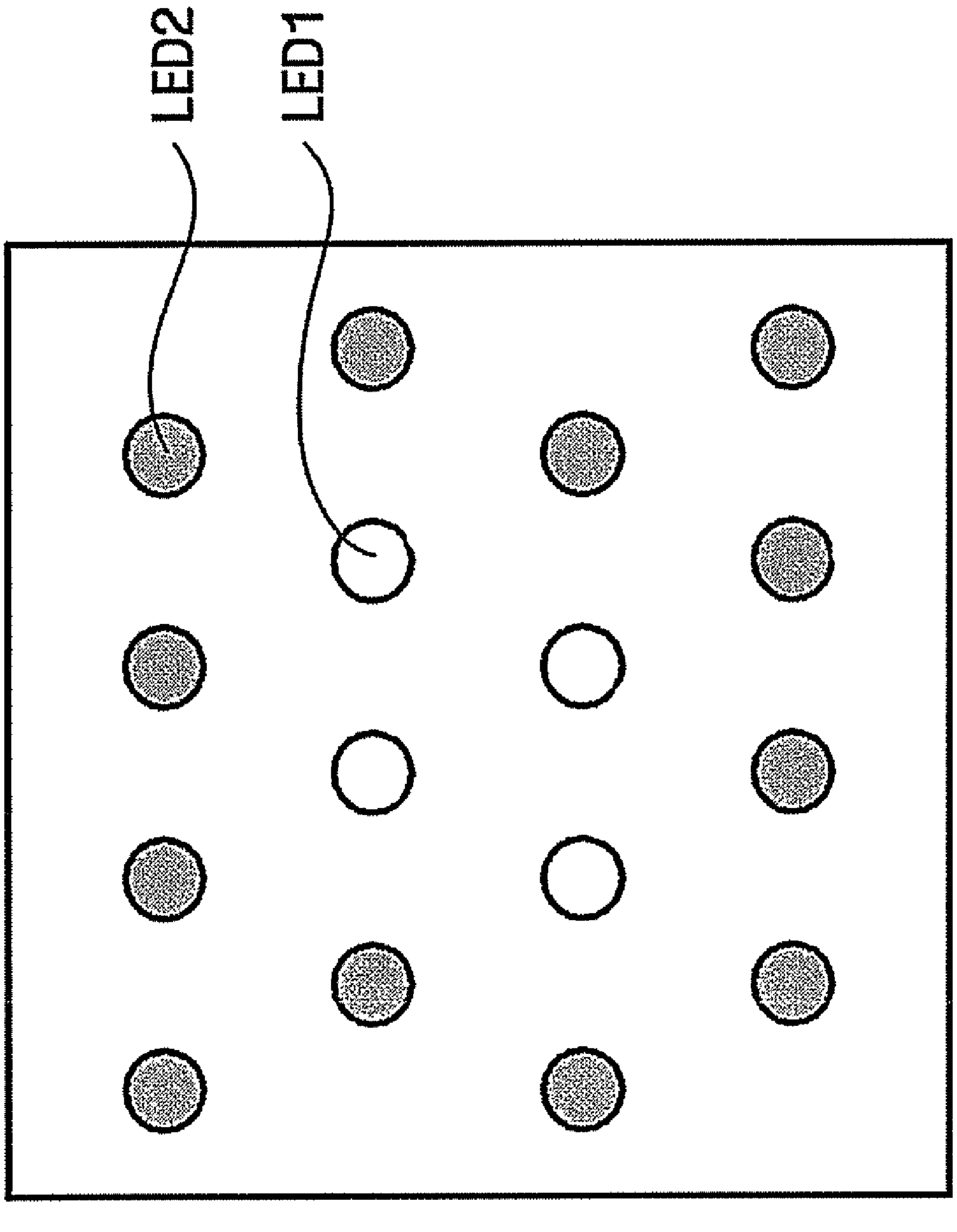
Figure 7:
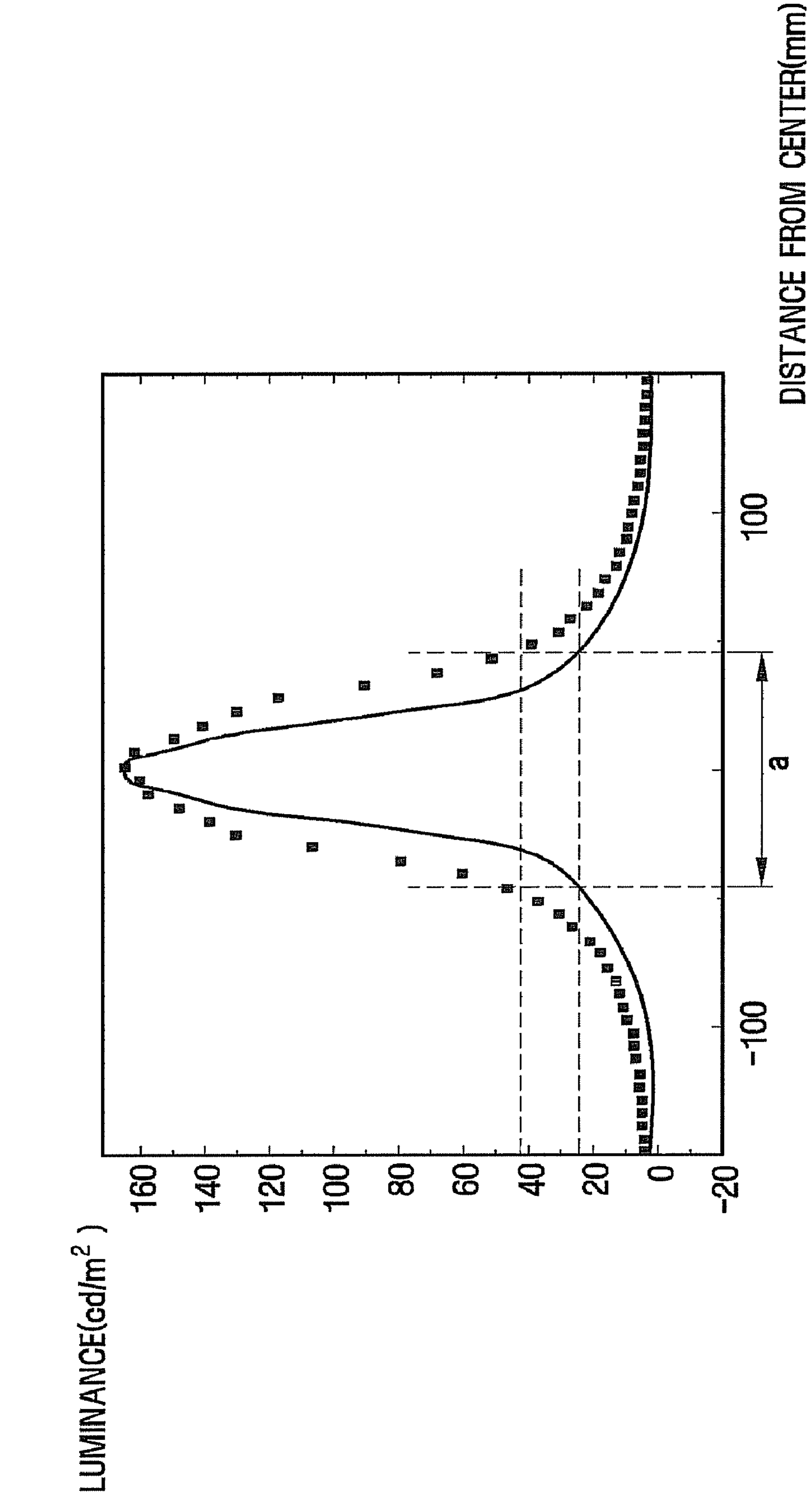
FIG. 7 illustrates a graph of a point spread function ("PSF") of an exemplary embodiment of an LCD including an exemplary embodiment of a light-emitting block having the exemplary arrangement shown in FIG. 6A.

An exemplary embodiment of the LCD 10 and an exemplary embodiment of a method of driving the LCD 10 will hereinafter be described in further detail with reference to FIGS. 6A through 7. FIGS. 6A and 6B illustrate diagrams of various exemplary arrangements of a plurality of first light-emitting elements LED1 and a plurality of second light-emitting elements LED2 in each light-emitting block of the LCD 10, and FIG. 7 illustrates a graph of a point spread function ("PSF") of an LCD including an exemplary embodiment of a light-emitting block having the exemplary arrangement shown in FIG. 6A. A PSF indicates the variation of the degree of spread of light emitted by a light-emitting block according to the distance from the center of the light-emitting block. Referring to FIGS. 6A through 7, reference character "a" indicates the horizontal length of a light-emitting block.

Referring to FIGS. 6A and 6B, a plurality of first light-emitting elements LED1 may constitute a first string string1 of each of the light-emitting blocks LB1 through LB(n×m) shown in FIG. 3, and a plurality of second light-emitting elements LED2 may constitute a second string string2 of each of the light-emitting blocks LB1 through LB(n×m). A light-emitting block is shown in FIGS. 6A and 6B as being a rectangle having horizontal and vertical lengths of "a" and "b", respectively.

Referring to the exemplary embodiments of arrangements of light-emitting elements in FIGS. 6A and 6B, the ratio of the number of first light-emitting elements LED1 disposed near the center of a light-emitting block to the number of first light-emitting elements LED1 disposed a predetermined distance away from the center of the light-emitting block is high. That is, most of the first light-emitting elements LED1 may be disposed near the center of a light-emitting block, whereas most of the second light-emitting elements LED2 may be disposed near the boundaries of a light-emitting block, e.g., a greater number of first light-emitting elements are disposed within a predetermined distance from the center of a light-emitting block than a number of second light-emitting elements disposed within the same predetermined distance. In the present exemplary embodiment, the combined luminous flux of the first light-emitting elements LED1 may be higher than the combined luminous flux of the second light-emitting element LED2. Therefore, even if the same current is applied to the first light-emitting elements LED1 and the second light-emitting elements LED2, the amount of light emitted by each of the first light-emitting elements LED1 may be greater than the amount of light emitted by each of the second light-emitting elements LED2. Therefore, it is possible to improve a PSF of each of the light-emitting blocks LB1 through LB(n×m). This will hereinafter be described in further detail with reference to FIG. 7.

Referring to FIG. 7, a dotted curve represents a PSF of a light-emitting block according to a comparative example, e.g., a PSF of a light-emitting block having an arrangement similar to that shown in FIG. 6A wherein the amount of light emitted by a first light-emitting element LED1 is the same as the amount of light emitted by a second light-emitting element LED2, and a solid curve represents a PSF of an exemplary embodiment of a light-emitting block of the embodiment of FIGS. 1 through 6B, e.g., a PSF of a light-emitting block having the arrangement shown in FIG. 1 when the amount of light emitted by a first light-emitting element LED1 is greater than the amount of light emitted by a second light-emitting element LED1.

Referring to FIG. 7, the affect of light emitted by a light-emitting block on other adjacent light-emitting blocks is less when the amount of light emitted by a first light-emitting element LED1 is greater than the amount of light emitted by a second light-emitting element LED2 than when the amount of light emitted by a first light-emitting element LED1 is the same as the amount of light emitted by a second light-emitting element LED2. More specifically, referring to the dotted curve shown in FIG. 7, the luminance at the boundaries of a light-emitting block is about 40 cd/$m^2$, which is about 25% of a maximum luminance level of about 160 cd/$m^2$. On the other hand, referring to the solid curve show in FIG. 7, the luminance at the boundaries of a light-emitting block is only about 20 cd/$m^2$, which is about 12.5% of the maximum luminance level of about 160 cd/$m^2$. In short, according to exemplary embodiments of the present invention, it is possible to reduce the luminance at the boundaries of a light-emitting block by about 50%, compared to the comparative example. In this manner, it is possible to improve PSF and thus to reduce the affect of a light-emitting block has on other adjacent light-emitting blocks.

In one exemplary embodiment, if a predetermined light-emitting block is white and a light-emitting block adjacent to the predetermined light-emitting block is black, a contrast ratio may decrease due to the dispersion of light emitted from the predetermined light-emitting block even if the light-emitting block adjacent to the predetermined light-emitting block is turned off. However, according to the exemplary embodiment shown in FIG. 1 through 5, it is possible to reduce the dispersion of light emitted from a light-emitting block into other adjacent light-emitting blocks and thus to improve a contrast ratio of the exemplary embodiment of an LCD 10. Therefore, it is possible to improve the display quality of an LCD.

Figure 8A:
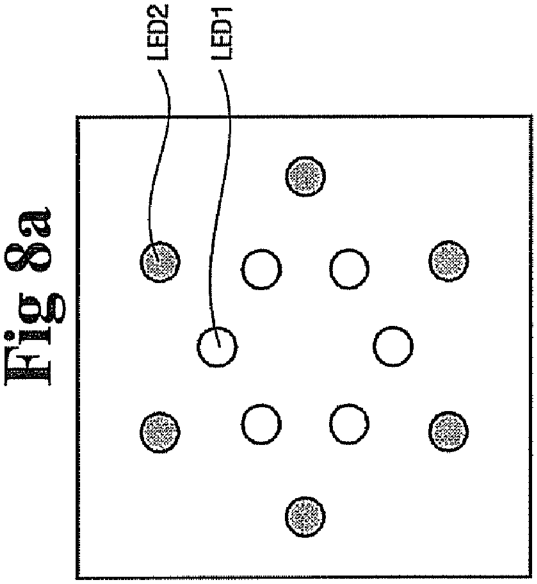
FIGS. 8A through 8E illustrate diagrams of various exemplary arrangements of a plurality of first light-emitting elements and a plurality of second light-emitting elements in each light-emitting block of another exemplary embodiment of an LCD according to the present invention.
Figure 8B:
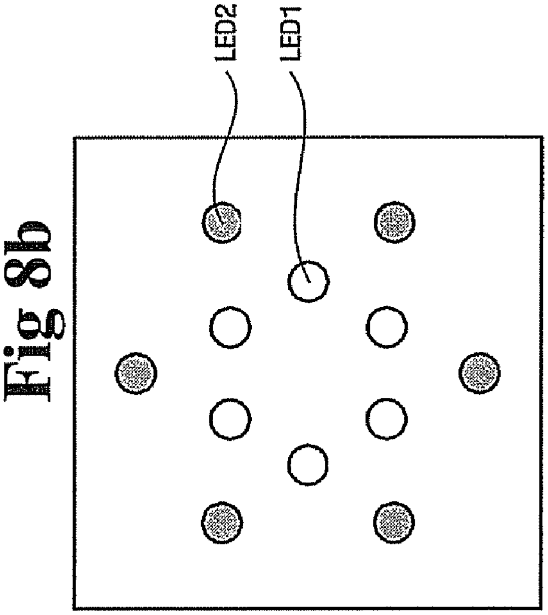
Figure 8C:
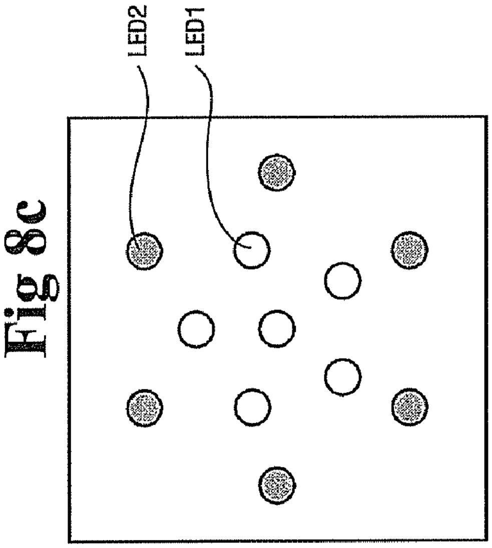
Figure 8D:
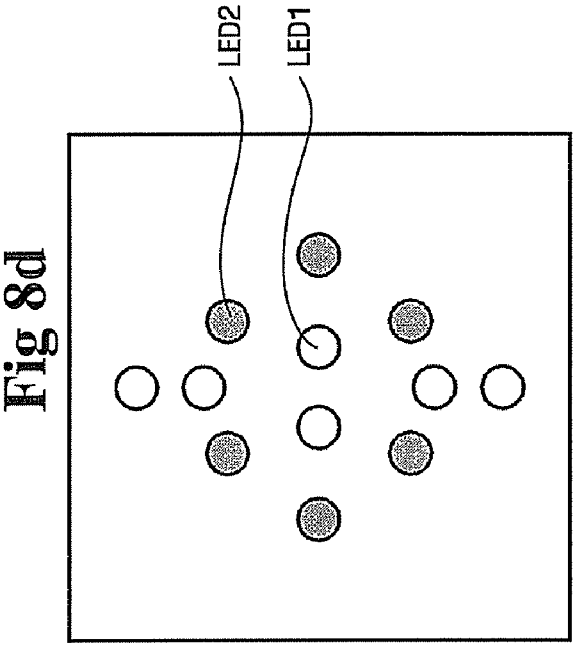
Figure 8E:
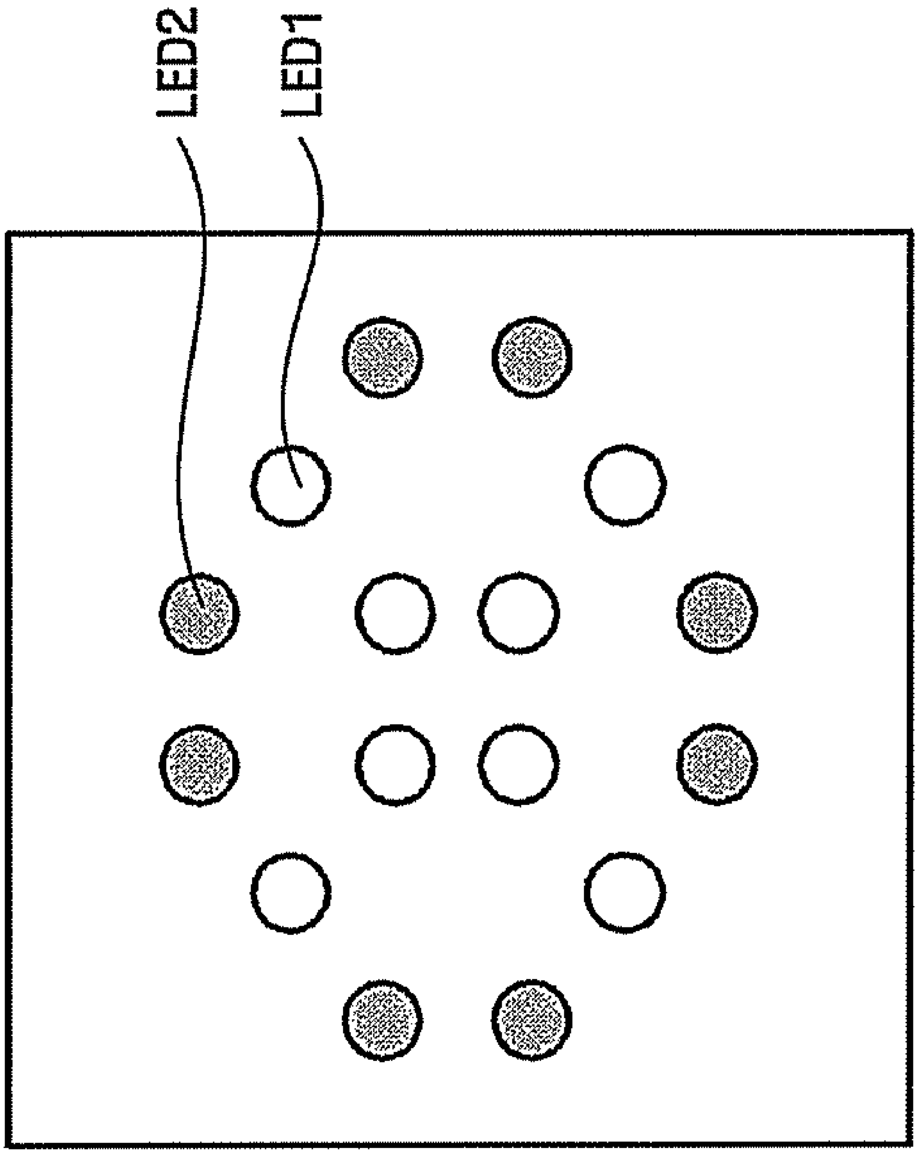
Figure 9:
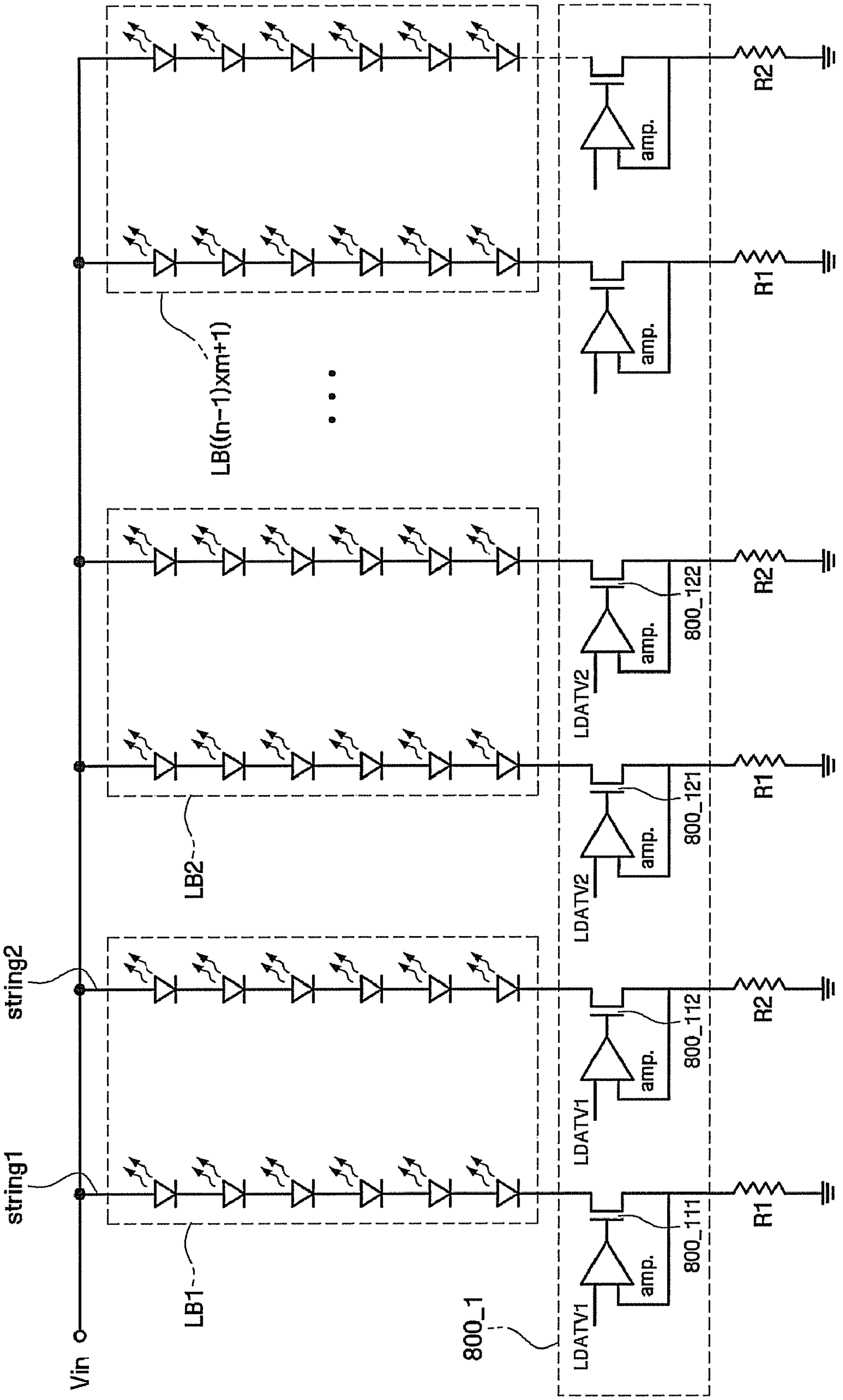
FIG. 9 illustrates a circuit diagram of an exemplary embodiment of a circuit for controlling a current flown into first and second strings of the exemplary embodiment of an LCD of FIGS. 8A through 8E.

An LCD and a method of driving the LCD, according to other exemplary embodiments of the present invention will hereinafter be described in detail with reference to FIGS. 8A through 9. FIGS. 8A through 8E illustrates diagrams of various exemplary arrangements of a plurality of first light-emitting elements LED1 and a plurality of second light-emitting elements LED2 in each light-emitting block of another exemplary embodiment of an LCD according to the present invention, and FIG. 9 illustrates a circuit diagram of an exemplary embodiment of a circuit for controlling a current flown into first and second strings of the LCD of FIGS. 8A through 8E. In FIGS. 1 through 9, like reference numerals indicate like elements, and thus, duplicate descriptions thereof will be omitted.

Referring to FIGS. 8A through 8E, a plurality of first light-emitting elements LED1 may constitute a first string string1 of each of the light-emitting blocks LB1 through LB(n×m) illustrated in FIG. 3, and a plurality of second light-emitting elements LED2 may constitute a second string string2 of each of the light-emitting blocks LB1 through LB(n×m).

Referring to FIGS. 8A through 8E, the ratio of the number of first light-emitting elements LED1 disposed near the center of a light-emitting block to the number of first light-emitting elements LED1 disposed a predetermined distance away from the center of the light-emitting block is high. That is, most of the first light-emitting elements LED1 may be disposed near the center of a light-emitting block, whereas most of the second light-emitting elements LED2 may be disposed near the boundaries of a light-emitting block, e.g., a greater number of first light-emitting elements are disposed within a predetermined radius of the center of a light-emitting block than a number of second light-emitting elements disposed within the same predetermined radius. In one exemplary embodiment all of the first light-emitting elements LED1 are disposed interior to the second light-emitting elements LED2. In the present exemplary embodiments the number of first light-emitting elements LED1 included in a light-emitting block is the same as the number of second light-emitting elements LED2 included in the light-emitting block. Also, in the present exemplary embodiment the current that flows into a first string string1 is higher than the current that flows into a second string string2. Therefore, even if a first light-emitting element LED1 has the same luminous properties as that of a second light-emitting element LED2, e.g., they are made from substantially similar materials, the amount of light emitted by a first light-emitting element LED1 may be greater than the amount of light emitted by a second light-emitting element LED2. Therefore, it is possible to improve PSF and enhance the display quality.

It will hereinafter be described in detail how to apply a higher current to a first string string1 than to a second string string2 with reference to FIG. 9. Even though FIG. 9 only illustrates how the first backlight driver 800_1 controls the first column of light-emitting blocks, i.e., the light-emitting blocks LB1 through LB((n−1)×m+1)), it would be apparent to one of ordinary skill in the art that the description of the operation of the first backlight driver 800_1 can be directly applied to the other backlight drivers 800_2 through 800_m.

Referring to FIG. 9, an input voltage Vin is applied to the first ends of the first and second strings string1 and string2 of each of the light-emitting blocks LB1 through LB((n−1)×m+1)). A plurality of pairs of transistors 800_111 and 800_112, 800_121 and 800_122, . . . , 800_1((n−1)×m+1)1 and 800_1((n−1)×m+1)2 and a plurality of pairs of resistors may be respectively provided between a ground node and the light-emitting blocks LB1 through LB((n−1)×m+1)). Each of the pairs of resistors includes a first resistor R1 connected to a second end of the first string string1 of a corresponding light-emitting block, and a second resistor R2 connected to a second end of the second string string2 of the corresponding light-emitting block. In one exemplary embodiment, the resistance of the first resistors R1 may be lower than the resistance of the second resistors R2.

In addition, a plurality of pairs of amplifiers (amp.) may be respectively provided for the light-emitting blocks LB1 through LB((n−1)×m+1)). Each of the pairs of amplifiers (amp.) may receive an optical data voltage (LDATV1, LDATV2, . . . ), which is determined according to an image displayed by a display block, may receive a voltage applied to the first and second resistor R1 and R2 of a corresponding light-emitting block, and may apply a bias voltage to the transistors of the corresponding light-emitting block.

The operation of the first light-emitting block LB1 will hereinafter be described in further detail. One of ordinary skill in the art would appreciate that the description of the operation of the first light-emitting block LB1 may be applied to the other light-emitting blocks LB2 through LB((n−1)×m+1).

Referring to the first light-emitting block LB1 illustrated in FIG. 9, the amplifiers (amp.) corresponding to the first light-emitting block LB1 receive an optical data voltage LDATV1 which is determined according to an image displayed by the first display block DB1 corresponding to the first light-emitting block LB1, receive a voltage applied to the first and second resistors R1 and R2 corresponding to the first light-emitting block LB1, and provide the transistors 800_111 and 800_112 with the difference between the optical data voltage LDATV1 and the voltage applied to the first and second resistors R1 and R2 corresponding to the first light-emitting block LB1 as a bias voltage.

The transistors 800_111 and 800_112 operate in a linear region, in which the current that flows between the drain and source electrodes of each of the transistors 800_111 and 800_112 increases according to a bias voltage. Since, in the present exemplary embodiment, the resistance of the first resistors R1 is lower than the resistance of the second resistors R2, the current that flows into the first string string1 may be higher than the current that flows into the second string string2.

The difference between the voltage applied to the first light-emitting elements LED1 of the first string string1 and the voltage applied to the second light-emitting elements LED2 of the second string string2 may be set to be about 2 V or less. As described above, if the current that flows into the first string string1 is higher than the current that flows into the second string string2, the voltage applied to the first light-emitting elements LED1 may be higher than the voltage applied to the second light-emitting elements LED2. Therefore, the difference between the voltage of the first light-emitting elements LED1 and the voltage of the second light-emitting elements LED2 may increase. Heat may be generated in a channel between the first and second strings string1 and string2 of the first backlight driver 800_1, which may cause damage to the first backlight driver 800_1. Therefore, the difference between the voltage of the first light-emitting elements LED1 and the voltage of the second light-emitting elements LED2 may be set to not exceed about 2 V.

Figure 10A:
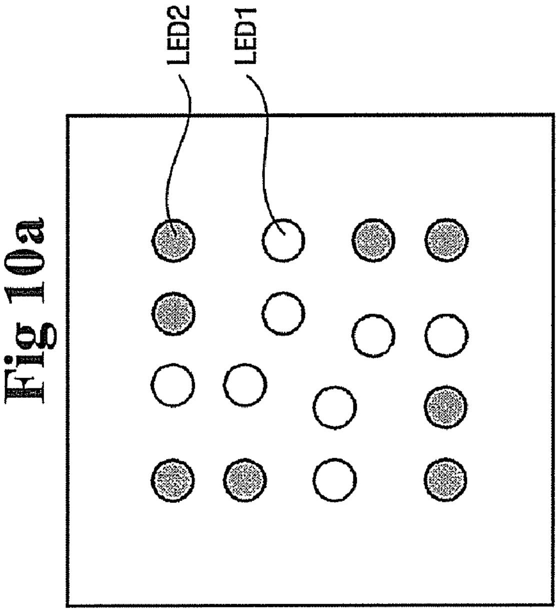
FIGS. 10A and 10B illustrate diagrams of various exemplary arrangements of a plurality of first light-emitting elements and a plurality of second light-emitting elements in each light-emitting block of another exemplary embodiment of an LCD according to the present invention.
Figure 10B:
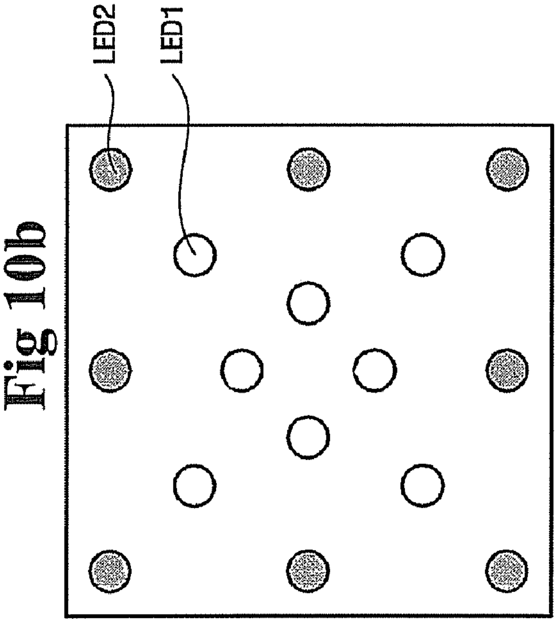

An LCD and a method of driving the LCD, according to other exemplary embodiments of the present invention, will hereinafter be described in detail with reference to FIGS. 10A and 10B. FIGS. 10A and 10B illustrate diagrams of various exemplary arrangements of a plurality of first light-emitting elements LED1 and a plurality of second light-emitting elements LED2 in each light-emitting block of another exemplary embodiment of an LCD according to the present invention. In FIGS. 7 through 10B, like reference numerals indicate like elements, and thus, duplicate descriptions thereof will be omitted.

Referring to FIGS. 10A and 10B, the ratio of the number of first light-emitting elements LED1 disposed near the center of a light-emitting block to the number of first light-emitting elements LED1 disposed a predetermined distance away from the center of the light-emitting block is high. That is, most of the first light-emitting elements LED1 may be disposed near the center of a light-emitting block, whereas most of the second light-emitting elements LED2 may be disposed near the boundaries of a light-emitting block, e.g., a greater number of first light-emitting elements are disposed within a predetermined radius of the center of a light-emitting block than a number of second light-emitting elements disposed within the same predetermined radius. The first light-emitting elements LED1 and the second light-emitting elements LED2 may together form the outline of a rectangle. The light-emitting blocks DB1 through DB(n×m) shown in the exemplary embodiment of FIG. 1 are rectangular. Thus, if the first light-emitting elements LED1 and the second light-emitting elements LED2 are arranged in each of the light-emitting blocks DB1 through DB(n×m) in such a manner as shown in FIG. 10A or 10B, the density of the first light-emitting elements LED1 and the second light-emitting elements LED2 may become regular. Thus, it is possible to enhance the uniformity of luminance of each of the light-emitting blocks DB1 through DB(n×m) and improve the display quality of an LCD.

In the exemplary embodiment of FIGS. 10A and 10B, like in the exemplary embodiment of FIGS. 8A through 8E, it is possible to apply a higher current to a second string string2 than to a first string string1 by using the method described above with reference to FIG. 9. Therefore, it is possible to enable the amount of light emitted by each first light-emitting element LED1 to be greater than the amount of light emitted by each second light-emitting element LED2. Thus, in the exemplary embodiment of FIGS. 10A and 10B, like in the exemplary embodiment of FIGS. 8A through 8E, it is possible to improve the display quality of an LCD.

Figure 11A:
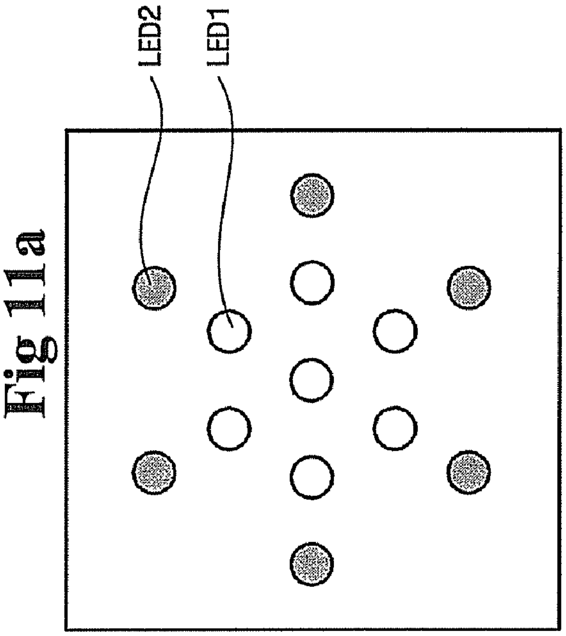
FIGS. 11A and 11B illustrate diagrams of various exemplary arrangements of a plurality of first light-emitting elements and a plurality of second light-emitting elements in each light-emitting block of another exemplary embodiment of an LCD according to the present invention.
Figure 11B:
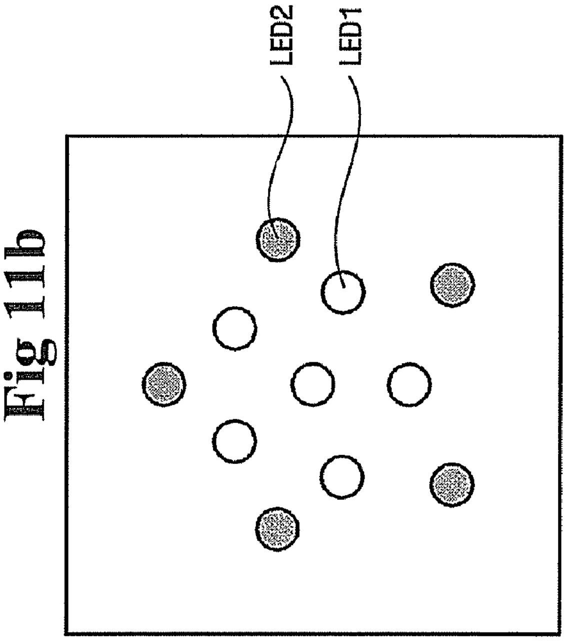
Figure 12:
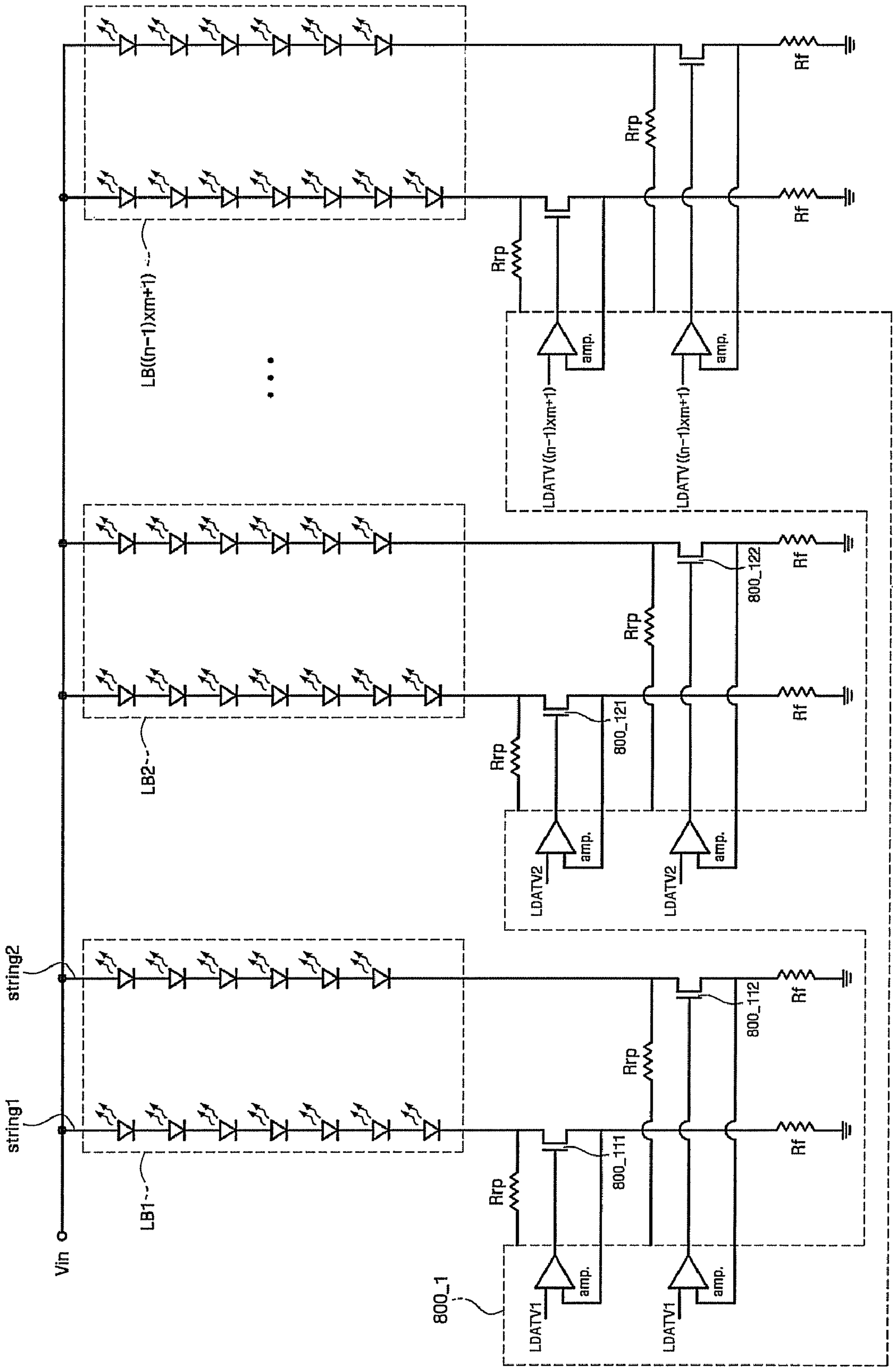
FIG. 12 illustrates an equivalent circuit diagram of an exemplary embodiment of a circuit for controlling a current flow into first and second strings of the exemplary embodiment of an LCD of FIGS. 11A and 11B.

An LCD and a method of driving the LCD, according to other exemplary embodiments of the present invention, will hereinafter be described in detail with reference to FIGS. 11A through 12. FIGS. 11A and 11B illustrate diagrams of various exemplary arrangements of a plurality of first light-emitting elements LED1 and a plurality of second light-emitting elements LED2 in each light-emitting block of another exemplary embodiment of an LCD according to the present invention, and FIG. 12 illustrates a circuit diagram of an exemplary embodiment of a circuit for controlling a current provided to first and second strings string1 and string2 of the LCD of FIGS. 11A and 11B. In FIGS. 1 through 6B and 11A through 12, like reference numerals indicate like elements, and thus, duplicate descriptions thereof will be omitted.

Referring to FIGS. 11A and 11B, the ratio of the number of first light-emitting elements LED1 disposed near the center of a light-emitting block to the number of first light-emitting elements LED1 disposed a predetermined distance away from the center of the light-emitting block is high. That is, the first light-emitting elements LED1 may all be disposed near the center of a light-emitting block, whereas the second light-emitting elements LED2 may all be disposed near the boundaries of a light-emitting block. In the present exemplary embodiment, the number of first-light emitting elements LED1 included in a light-emitting block is greater than the number of second light-emitting elements LED2 included in the light-emitting block. In the exemplary embodiment of FIGS. 11A through 12, the current that flows into a first string string1 is higher than the current that flows into a second string string2. Thus, the amount of light emitted by each of the first light-emitting elements LED1 may be greater than the amount of light emitted by each of the second light-emitting elements LED2 even if the first light-emitting elements LED1 are composed of substantially the same material as that of the second light-emitting elements LED2. Therefore, in the exemplary embodiment of FIGS. 11A through 12, like in the exemplary embodiment of FIGS. 1 through 6B, it is possible to improve the display quality of an LCD.

It will hereinafter be described in detail how to apply a higher current to a first string string1 than to a second string string2 with reference to FIG. 12. Even though FIG. 12 only illustrates how the first backlight driver 800_1 controls the first column of light-emitting blocks, e.g., the light-emitting blocks LB1 through LB((n−1)×m+1)), it would be apparent to one of ordinary skill in the art that the description of the operation of the first backlight driver 800_1 can be directly applied to the other backlight drivers 800_2 through 800_m.

Referring to FIG. 12, an input voltage Vin is applied to the first ends of the first and second strings string1 and string2 of each of the light-emitting blocks LB1 through LB((n−1)×m+1)). Apluralityofpairs of transistors 800_111 and 800_112, 800_121 and 800_122, . . . , and a plurality of pairs of feedback resistors Rf may be respectively provided between a ground node and the light-emitting blocks LB1 through LB((n−1)×m+1)).

In addition, a plurality of pairs of amplifiers (amp.) may be respectively provided between the ground node and the light-emitting blocks LB1 through LB((n−1)×m+1)). Each of the pairs of amplifiers (amp.) may receive an optical data voltage (LDVAT1, LDATV2, . . . ) which is determined according to an image displayed by a display block, and may receive a voltage applied to the feedback resistors Rf of a corresponding light-emitting block, and may apply a bias voltage to the transistors of the corresponding light-emitting block.

A breakdown detection module may determine whether the first light-emitting elements LED1 or the second light-emitting elements LED2 of, for example, the first light-emitting block LB1, are short-circuited or open based on the voltage at a first node between the first string string1 of the first light-emitting block LB1 and the transistor 800_111 and the voltage at a second node between the second string string2 of the first light-emitting block LB2 and the transistor 800_112. The breakdown detection module may include a first repair resistor Rrp connected to the first node between the first string string1 of the first light-emitting block LB1 and the transistor 800_111, a second repair resistor Rrp connected to the second node between the second string string2 of the first light-emitting block LB1 and the transistor 800_112, and a breakdown determination unit (not shown) connected to the first and second repair resistors Rrp and provided in the first backlight driver 800_11.

The resistance of the repair resistors Rrp may be high enough to prevent the operation of the breakdown detection module from affecting the operations of the first and second strings string1 and string2 of the first light-emitting block LB1 during normal operation, e.g., non-short-circuited operation. The breakdown determination unit measures the voltages at the repair resistors Rp and compares the measured voltages with a voltage obtained when the first light-emitting elements LED1 of the first string string1 of the first light-emitting block LB1 or the second light-emitting elements LED2 of the second string string2 of the first light-emitting block LB1 function properly, and determines whether the first light-emitting elements LED1 of the first string string1 of the first light-emitting block LB1 or the second light-emitting elements LED2 of the second string string2 of the first light-emitting block LB1 are short-circuited or open. In one exemplary embodiment, the breakdown determination unit may cease operation of the corresponding backlight driver when a short-circuit is detected.

The operation of the first light-emitting block LB1 will hereinafter be described in further detail. It is would be apparent to one of ordinary skill in the art that the description of the operation of the first light-emitting block LB1 can be applied to the operations of the other light-emitting blocks LB2 through LB((n−1)×m+1).

Referring to the first light-emitting block LB1 shown in FIG. 12, the amplifiers (amp.) receive the optical data voltage LDATV1 which is determined according to the image displayed by the first display block DB1 show in FIG. 1, and receive a voltage applied to the feedback resistors Rf The feedback resistors Rf detect the current that flows into the first and second strings string1 and string2, respectively, and convert the result of the detection into a feedback voltage. The amplifiers (amp.) amplify the difference between the optical data voltage LDATV1 and the feedback voltage and provide the result of the amplification to the transistors 800_111 and 800_112 as a bias voltage. Since a feedback loop is generated between the amplifiers (amp.) and the feedback resistors Rf, it is possible to control the bias voltage and thus to enable a uniform current to flow into the first string string1 or the second string string2.

The transistors 800_111 and 800_112 operate in a linear region, in which the current that flows between the drain and source electrodes of each of the transistors 800_111 and 800_112 increases according to a bias voltage. In the present exemplary embodiment, the number of first light-emitting elements LED1 included in the first string string1 is greater than the number of second light-emitting elements LED2 included in the second string string2, and the feedback resistors Rf have substantially the same resistance. Thus, if the transistors 800_111 and 800_112 are selected so that a higher voltage can be applied between the drain and source electrodes of the transistor 800_112 than between the drain and source electrodes of the transistor 800_111, the current that flows into the first string string1 may become higher than the current that flows into the second string string2.

In one exemplary embodiment, the transistors 800_111 and 800_112 may be provided outside the first backlight driver 800_1. In this case, it is possible to easily select the transistors 800_111 and 800_112 and thus to apply a higher current to the first string string1 than the second string string2.

In the exemplary embodiment of FIGS. 11A through 12, the difference between the voltage of the first light-emitting elements LED1 of the first string string1 of each of the light-emitting blocks LB1 through LB((n−1)×m+1)) and the voltage of the second light-emitting elements LED2 of the second string string2 of each of the light-emitting blocks LB1 through LB((n−1)×m+1)) may be set to be about 2 V or less for the same reason as described above with respect to the exemplary embodiment of FIGS. 8A through 9.

Figure 13:
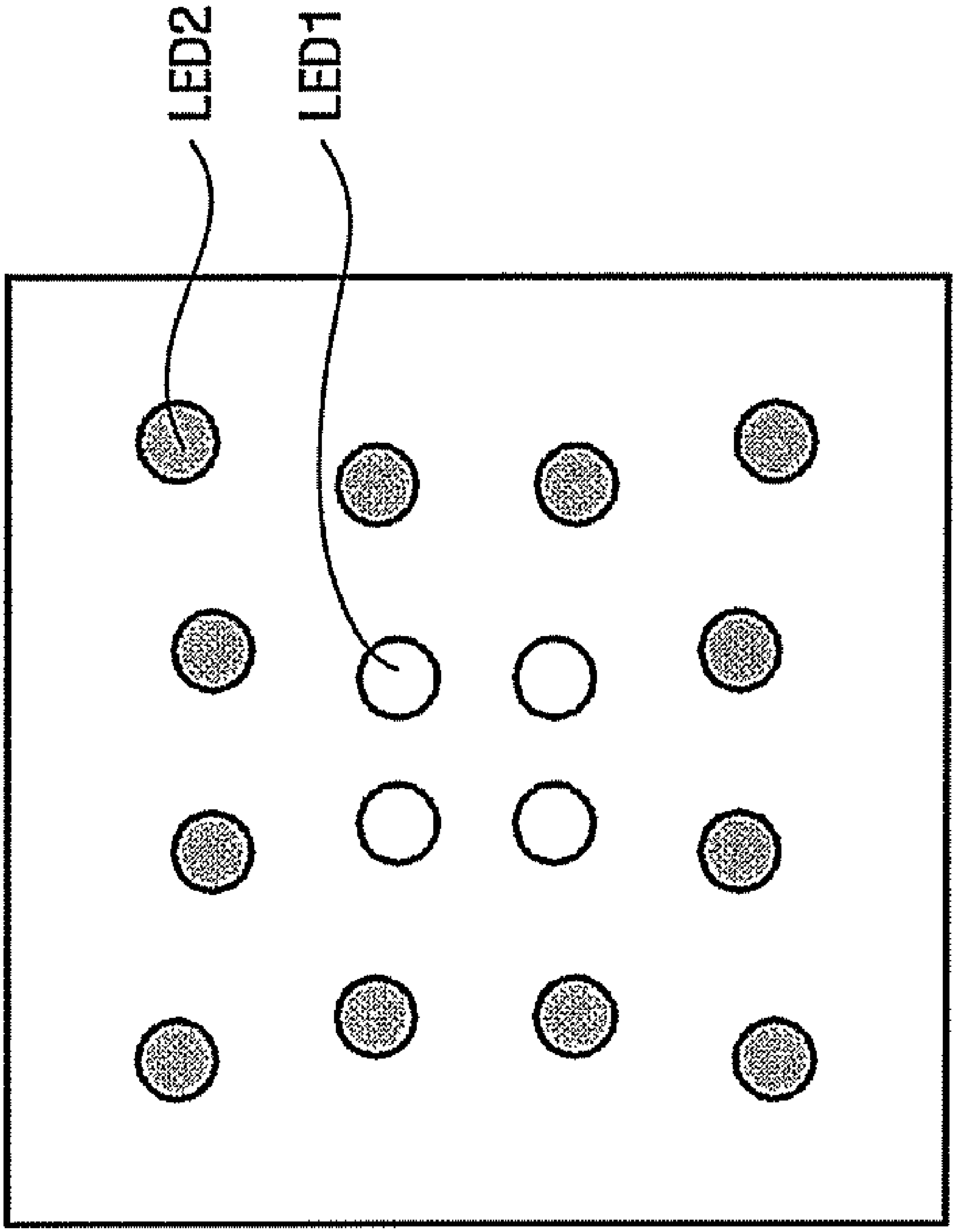
FIG. 13 illustrates a diagram of an exemplary arrangement of a plurality of first light-emitting elements and a plurality of second light-emitting elements in each light-emitting block of another exemplary embodiment of an LCD according to the present invention.

An LCD and a method of driving the LCD, according to other exemplary embodiments of the present invention, will hereinafter be described in detail with reference to FIG. 13. FIG. 13 illustrates a diagram of the exemplary arrangement of a plurality of first light-emitting elements and a plurality of second light-emitting elements in each light-emitting block of another exemplary embodiment of an LCD according to the present invention. In FIGS. 10A, 10B and 13, like reference numerals indicate like elements, and thus, detailed descriptions thereof will be omitted.

Referring to FIG. 13, the ratio of the number of first light-emitting elements LED1 disposed near the center of a light-emitting block to the number of first light-emitting elements LED1 disposed a predetermined distance away from the center of the light-emitting block is high. That is, the first light-emitting elements LED1 may all be disposed near the center of a light-emitting block, whereas the second light-emitting elements LED2 may all be disposed near the boundaries of the light-emitting block, e.g., only first light-emitting elements are disposed within a predetermined radius of the center of a light-emitting block and only second light-emitting elements are disposed outside of the predetermined radius. The first light-emitting elements LED1 and the second light-emitting elements LED2 may together form the outline of a rectangle. The light-emitting blocks DB1 through DB(n×m) show in FIG. 13 are rectangular. Thus, if the first light-emitting elements LED1 and the second light-emitting elements LED2 are arranged in each of the light-emitting blocks DB1 through DB(n×m) in such a manner as shown in FIG. 13, the density of the first light-emitting elements LED1 and the second light-emitting elements LED2 may become regular. Thus, it is possible to enhance the uniformity of luminance of each of the light-emitting blocks DB1 through DB(n×m) and improve the display quality of an LCD.

In the exemplary embodiment of FIG. 13, it is possible to apply a higher current to a first string string1 of first light-emitting elements LED1 than to a second string string2 of second light-emitting elements LED2 by using the method described above with reference to FIG. 12. Therefore, it is possible to enable the amount of light emitted by each first light-emitting element LED1 to be greater than the amount of light emitted by each second light-emitting element LED2. Thus, in the exemplary embodiment of FIG. 13, like in the exemplary embodiment of FIGS. 8A through 8E, it is possible to improve the display quality of an LCD.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display comprising:

a liquid crystal panel which displays an image; and a plurality of light-emitting blocks which provide light to the liquid crystal panel, wherein each of the light-emitting blocks includes a first string having a plurality of first light-emitting elements connected in series and a second string having a plurality of second light-emitting elements connected in series, and an amount of light emitted by each of the first light-emitting elements is different from an amount of light emitted by each of the second light-emitting elements, wherein a combined amount of light emitted by light-emitting elements disposed within a predetermined distance from a center of a light-emitting block among the first light-emitting elements and the second light-emitting elements is greater than a combined amount of light emitted by light-emitting elements disposed a predetermined distance away from the center of the light-emitting block among the first light-emitting elements and the second light-emitting elements.

2. The liquid crystal display of claim 1, wherein:

a combined amount of light emitted by the first light-emitting elements is greater than a combined amount of light emitted by the second light-emitting elements; and a greater number of first light-emitting elements is disposed within the predetermined distance from the center of the light-emitting block than a number of second light-emitting elements disposed within the predetermined distance.

3. The liquid crystal display of claim 1, wherein:

a majority of the first light-emitting elements are disposed in proximity to the center of the light-emitting block;

a majority of the second light-emitting elements are disposed in proximity to boundaries of a light-emitting block; and a combined amount of light emitted by the first light-emitting elements is greater than a combined amount of light emitted by the second light-emitting elements.

4. The liquid crystal display of claim 1, wherein:

a greater number of first light-emitting elements is disposed within the predetermined distance from the center of a light-emitting block than a number of second light-emitting elements disposed within the predetermined distance from the center of the light-emitting block;

a number of first light-emitting elements included in the light-emitting block is substantially the same as a number of second light-emitting elements included in the light-emitting block; and a current which flows into the first string is higher than a current which flows into the second string.

5. The liquid crystal display of claim 4, wherein:

the liquid crystal panel is divided into a plurality of display blocks respectively corresponding to the light-emitting blocks;

an input voltage is applied to a first end of the first string and to a first end of the second string;

the liquid crystal display further comprises a first transistor and a first resistor which are connected between a ground node and a second end of the first string, a first amplifier which receives an optical data voltage determined according to an image displayed by one of the display blocks, receives a voltage applied to the first resistor and applies a first bias voltage to the first transistor, a second transistor and a second resistor which are connected between a ground node and a second end of the second string, and a second amplifier which receives the optical data voltage, receives a voltage applied to the second resistor and applies a second bias voltage to the second transistor; and a resistance of the first resistor is less than a resistance of the second resistor.

6. The liquid crystal display of claim 5, wherein, as one of the first and second bias voltage increases, the current applied to the corresponding one of the first string and the second string increases.

7. The liquid crystal display of claim 4, wherein:

the liquid crystal panel is divided into a plurality of display blocks respectively corresponding to the light-emitting blocks;

each of the display blocks is substantially rectangular having about four sides, each side meeting adjacent sides at about a 90° angle; and the first light-emitting elements and the second light-emitting elements are arranged in the light-emitting block in an outline of a rectangle.

8. The liquid crystal display of claim 1, wherein:

a greater number of first light-emitting elements is disposed within the predetermined distance from the center of a light-emitting block than a number of second light-emitting elements disposed within the predetermined distance from the center of the light-emitting block;

a number of first light-emitting elements included in the light-emitting block is greater than a number of second light-emitting elements included in the light-emitting block; and a current which flows into the first string is higher than a current which flows into the second string.

9. The liquid crystal display of claim 8, wherein:

the liquid crystal panel is divided into a plurality of display blocks respectively corresponding to the light-emitting blocks;

an input voltage is applied to a first end of the first string and to a first end of the second string; and the liquid crystal display further comprises a first transistor and a first feedback resistor which are connected between a ground node and a second end of the first string, a first amplifier which receives an optical data voltage determined according to an image displayed by one of the display blocks, receives a voltage applied to the first feedback resistor and applies a first bias voltage to the first transistor, a second transistor and a second feedback resistor which are connected between a ground node and a second end of the second string, and a second amplifier which receives the optical data voltage, receives a voltage applied to the second feedback resistor and applies a second bias voltage to the second transistor.

10. The liquid crystal display of claim 9, wherein, as one of the first and second bias voltage increases, the current applied to the corresponding one of the first string and the second string increases.

11. The liquid crystal display of claim 9, further comprising a breakdown detection module which determines whether the first light-emitting elements are short-circuited or open based on a voltage of a node disposed between the second end of the first string and the first transistor, and which determines whether the second light-emitting elements are short-circuited or open based on a voltage of a node between the second end of the second string and the second transistor.

12. The liquid crystal display of claim 8, wherein:

the liquid crystal panel is divided into a plurality of display blocks respectively corresponding to the light-emitting blocks;

each of the display blocks is substantially rectangular having about four sides, each side meeting adjacent sides at about a 90° angle; and the first light-emitting elements and the second light-emitting elements are arranged in a light-emitting block in the outline of a rectangle.

13. The liquid crystal display of claim 1, wherein:

the liquid crystal panel is divided into a plurality of display blocks respectively corresponding to the light-emitting blocks; and luminance levels of the light-emitting blocks are controlled according to a plurality of images respectively displayed by the display blocks.

14. The liquid crystal display of claim 1, wherein:

the light-emitting blocks are classified into one or more groups; and the liquid crystal display further comprises a plurality of backlight drivers respectively controlling luminance levels of the groups.

15. The liquid crystal display of claim 14, wherein:

each of the backlight drivers comprises a number of channels corresponding to the number of light-emitting blocks included in each of the groups; and the first and second strings are connected to each of the channels.

16. The liquid crystal display of claim 15, wherein a difference between a voltage applied to the first light-emitting elements and a voltage applied to the second light-emitting elements is equal to or less than about 2 V.

17. A method of driving a liquid crystal display, the method comprising:

providing an liquid crystal display which comprises:

a liquid crystal panel including a plurality of display blocks; and a plurality of light-emitting blocks respectively corresponding to the display blocks, each of the light-emitting blocks including a first string which has a plurality of first light-emitting elements connected in series and a second string which has a plurality of second light-emitting elements connected in series;

determining luminance levels of the plurality of light-emitting blocks according to a plurality of images respectively displayed by the plurality of display blocks;

providing light to the each of the plurality of display blocks while simultaneously controlling an amount of light emitted by each of the first light-emitting elements and an amount of light emitted by each of the second light-emitting elements to differ from each other; and each of the display blocks displaying an image using the provided light, wherein a combined amount of light emitted by light-emitting elements disposed within a predetermined distance from a center of a light-emitting block among the first light-emitting elements and the second light-emitting elements is greater than a combined amount of light emitted by light-emitting elements disposed a predetermined distance away from the center of the light-emitting block among the first light-emitting elements and the second light-emitting elements.

18. The method of claim 17, wherein:

a combined amount of light emitted by the first light-emitting elements in each light-emitting block is greater than a combined amount of light emitted by the second light-emitting elements in the corresponding light-emitting block; and a number of first light-emitting elements disposed within the predetermined distance of the center of a light-emitting block is greater than a number of second light-emitting elements disposed within the predetermined distance of the center.

19. The method of claim 18, wherein:

a number of first light-emitting elements included in a light-emitting block is substantially the same as a number of second light-emitting elements included in the light-emitting block; and a current which flows into the first string is higher than a current which flows into the second string.

20. The method of claim 18, wherein:

a number of first light-emitting elements included in a light-emitting block is greater than a number of second light-emitting elements included in the light-emitting block; and a current which flows into the first string is higher than a current which flows into the second string.

* * * * *